Patented Feb. 26, 1924.

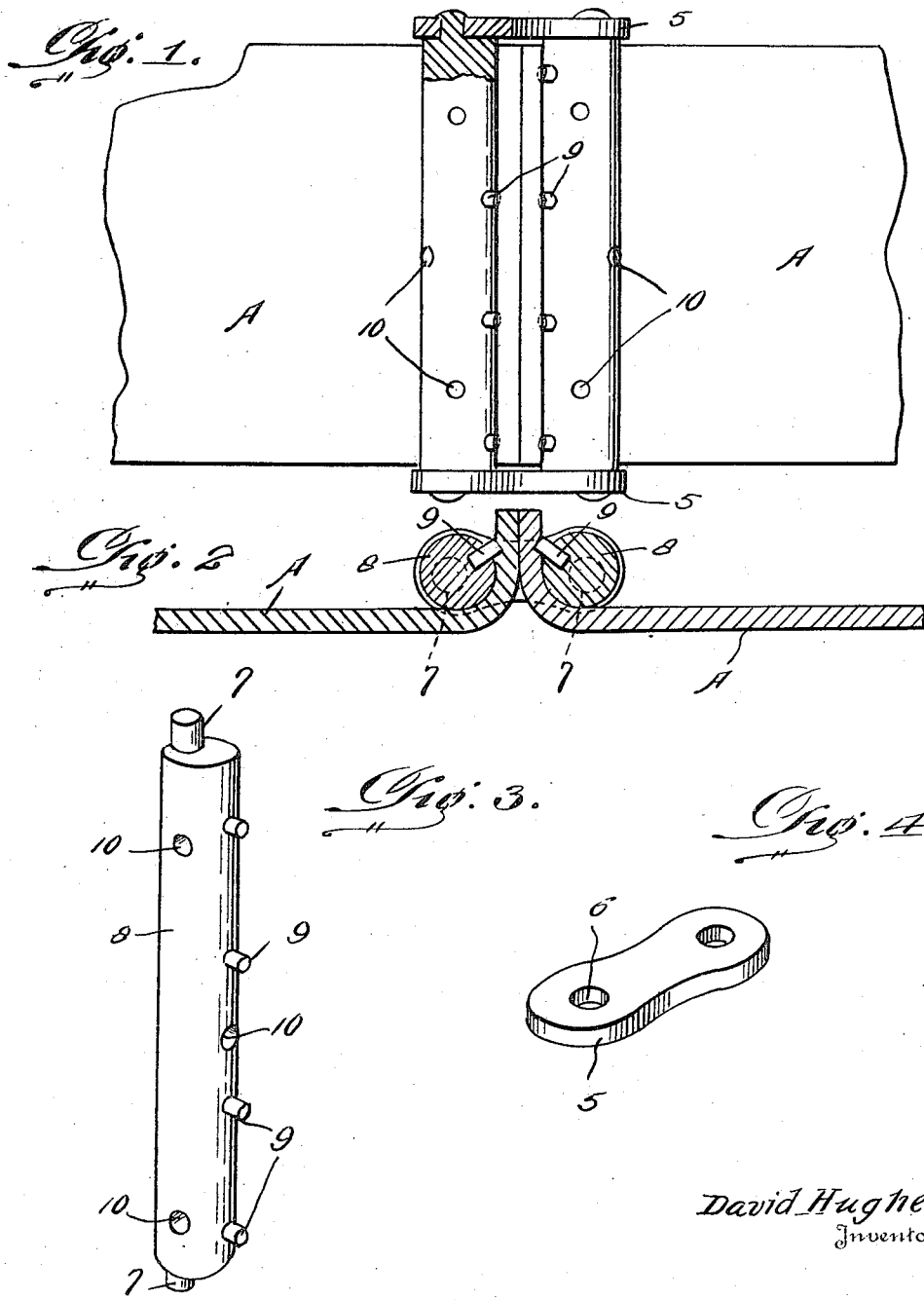

1,484,828

UNITED STATES PATENT OFFICE.

DAVID HUGHES, OF BUTTE, MONTANA.

BELT FASTENER.

Application filed September 1, 1923. Serial No. 660,498.

*To all whom it may concern:*

Be it known that I, DAVID HUGHES, a citizen of the United States, residing at Butte, in the county of Silver Bow and State of Montana, have invented certain new and useful Improvements in Belt Fasteners, of which the following is a specification.

In carrying out the present invention it is my purpose to provide a belt fastener wherein the ends of belts may be rigidly joined together in a novel, simple and expeditious manner, the nature of this fastener being such as not to become detached from the belt while the same is in operation.

The primary object of my invention resides in the provision of such a belt fastener that is extremely simple of construction and one that may be manufactured and marketed at small cost and wherein when the same is applied the pull upon the belt will serve as a means for actuating the elements of the belt fastener for more firmly securing the adjacent ends of the belt together.

With the above and other objects in view as the nature of this invention is better understood, the same comprises the novel form, combination and arrangement of parts set forth in the following specification, shown in the accompanying drawing and claimed.

In the drawing wherein like reference characters indicate corresponding parts throughout the different views, Figure 1 is a top plan view partly in cross section of my improved belt fastener applied, Figure 2 is a longitudinal cross section thereof, Figure 3 is an enlarged perspective of one of the locking elements of the fastener, and Figure 4 is a similar view of one of the link elements between which is carried the pair of fastening elements per se.

Now having particular reference to the drawing, my novel belt fastener comprises a pair of links 5, 5 preferably of the shape as more clearly shown in Figure 4, each of these links being provided at their opposite ends with alined openings 6 through which extend the eccentrically disposed pins 7 upon the opposite ends of a pair of rollers 8, 8. Each of these rollers 8 is provided with a horizontal row of pins or studs 9 that bite into the ends of the belt as shown in Figure 2 when the rollers are rotated to the position shown in Figure 2, that is to such a position wherein these pins 9 are moved into a position adjacent each other.

Each of these rollers 8 is additionally provided with any desirable number of sockets 10 whereby a tool may be inserted therein for properly rotating the rollers for consequently forcing the pins to the ends of the belt A as shown in Figures 1 and 2.

In view of the foregoing description it will be obvious that when my improved belt fastener is applied to a belt as shown in the above mentioned Figures 1 and 2 a pull upon the belt will manifestly draw the pins 9 further downwardly for consequently embedding the same further into the belt and thereby precluding any liability of the fastener becoming disengaged.

Although I have herein set forth the most practical embodiment of the invention with which I am at the present time familiar, it is nevertheless to be understood that minor changes may be made within the invention without departing from the spirit and scope of the appended claim.

Having thus described this invention what I claim as new and desire to secure by Letters Patent is:—

In a belt fastener of the character described, a pair of plate elements, roller members eccentrically journaled between said plate members, means carried by said roller members for biting engagement with the ends of a belt when the device is applied, said rollers being formed with sockets for the reception of a tool whereby the same may be rotated to a position for engaging said pins within the ends of said belt.

In testimony whereof I affix my signature.

DAVE HUGHES.